United States Patent [19]

Nagaoka et al.

[11] 3,718,753

[45] Feb. 27, 1973

[54] TINT-CONTROL INDICATING APPARATUS FOR COLOR TV RECEIVERS

[75] Inventors: Yoshitomi Nagaoka, Neyagawa-shi; Takayuki Sagishima, Moriguchi, both of Japan

[73] Assignee: Matsushita Electric Industrial Co., Ltd., Kadoma, Osaka, Japan

[22] Filed: Jan. 6, 1971

[21] Appl. No.: 104,250

[30] Foreign Application Priority Data

Apr. 20, 1970 Japan............................45/34163

[52] U.S. Cl............................178/5.4 HE, 178/5.4 R

[51] Int. Cl................................................H04n 9/12

[58] Field of Search..........................178/5.4, 5.4 HE

[56] References Cited

UNITED STATES PATENTS

| | | | |
|---|---|---|---|
| 3,456,068 | 7/1969 | Wilhelmy | 178/5.4 HE |
| 3,586,761 | 6/1971 | Uetake | 178/5.4 R |

*Primary Examiner*—Richard Murray
*Attorney*—Wenderoth, Lind & Ponack

[57] ABSTRACT

A tint-control indicating apparatus for color TV receivers has a phase detecting means for separating chrominance signal components having a phase within a selected narrow sector of the color-spectrum wheel from the chrominance signals. A pulse-forming means coupled to said phase detecting means generates a pulse in response to an output signal of the phase detecting means. An indicating means coupled to said pulse-forming means is caused by the pulse to produce a visible color change on the television screen.

6 Claims, 7 Drawing Figures

INVENTORS
YOSHITOMI NAGAOKA
TAKAYUKI SAGISHIMA

BY Wenderoth, Lind & Ponack
ATTORNEYS

INVENTORS
YOSHITOMI NAGAOKA
TAKAYUKI SAGISHIMA

BY Wenderoth, Lind & Ponack
ATTORNEYS

INVENTORS
YOSHITOMI NAGAOKA
TAKAYUKI SAGISHIMA

BY Wenderoth, Lind & Ponack
ATTORNEYS

INVENTORS
YOSHITOMI NAGAOKA
TAKAYUKI SAGISHIMA

BY Wenderoth, Lind & Ponack
ATTORNEYS

TINT-CONTROL INDICATING APPARATUS FOR COLOR TV RECEIVERS

BACKGROUND OF THE INVENTION

1. Field of the Invention

The present invention relates to a tint-control indicating apparatus for correcting the color of a reproduced picture on color television receivers.

2. Description of the Prior Art

In a color television receiver, the hue of a reproduced picture frequently has to be corrected on account of the fluctuations of the colors, especially flesh tones. These fluctuations occur principally when the receiver is changed from one station to another, when the transmitting station switches cameras on live programs or switches from live transmission to film or tape.

The hue-information is carried in the chrominance signal which is a 3.58 MHz sinewave voltage signal. Each color reproduced on the screen of television receiver is the result of a definite phase difference between the 3.58 MHz sinewave chrominance signal and the 3.58 MHz burst provided as a reference phase.

Fleshtones are confined to a very narrow sector in the orange portion of the color-spectrum wheel. Here, slight phase errors have a major impact on the color television picture. Precise setting of the tint-control is therefore necessary for satisfactory reproduction of flesh tones, which, from the viewer's point of view, determines the quality of his picture. It is difficult for a television viewer to set the tint-control precisely. This is due to the fact that no reference hue, and more particularly, no reference fleshtone, has been provided in conventional color television receivers.

As described in an article entitled "Some Observations on the Reproduction of Flesh Colors" by C. J. Bartleson appearing in the May-June 1959 issue of Photographic Science and Engineering, preferred flesh-reproductions may be virtually the same hue as the memory-color for flesh and, further, the reproduction preference tends to be more yellow than actual flesh colors.

It is therefore most desirable to enable the color television receiver to reproduce fleshtone of the same hue as the flesh memory-color.

SUMMARY OF THE INVENTION

It is an object of this invention to provide a tint-control indicating apparatus for memorizing the memory-color for flesh and making possible precise setting of the tint-control.

It is another object of this invention to provide a tint-control indicating apparatus which enables unskilled viewers to adjust the tint-control more easily and quickly.

To achieve the foregoing objects, a tint-control indicating apparatus according to the present invention comprises a phase detecting means for separating a modulated chrominance signal within a selected sector of the color-spectrum wheel, a pulse-forming means for generating a pulse having a duration in response to the signal detected in said phase detecting means, and an indicating means for producing from said pulse a visible color change on the television screen.

DESCRIPTION OF DRAWING

These and other features of the invention will be apparent from the following description of the invention taken in connection with the accompanying drawings, in which.

DESCRIPTION OF PREFERRED EMBODIMENTS

Figure 1:
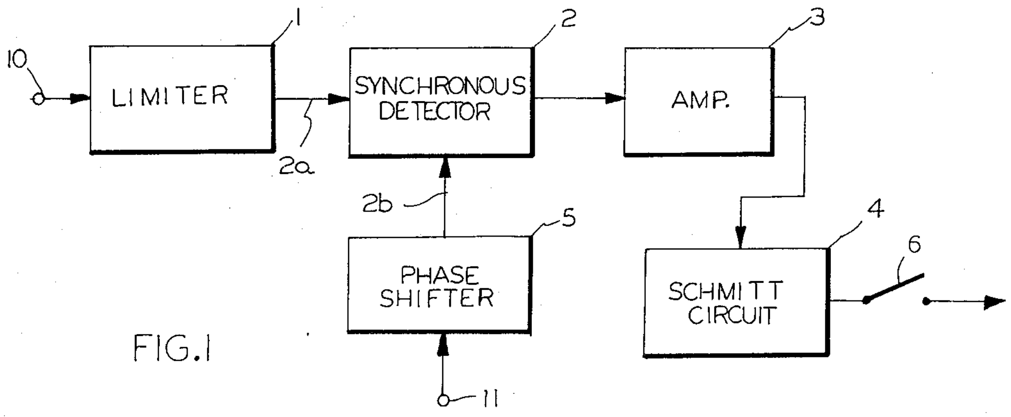
FIG. 1 is a block diagram of an embodiment of the tint-control indicating apparatus in accordance with the present invention.

Turning now to FIG. 1, there is shown a block diagram of one embodiment of the tint-control indicating apparatus in accordance with the present invention.

A limiter circuit 1 is provided which suppresses the amplitude variations of the modulated chrominance signal which is applied to the input terminal 10. The output signal of said limiter circuit 1 is therefore a phase modulated signal with relatively constant amplitude, the phase of which determines the hue of the transmitted color. The output of said limiter circuit 1 is connected to a first input terminal **2*a* of a synchronous detector 2 and which synchronously demodulates the phase modulated output signal of the limiter 1 by the 3.58 MHz reference signal generated in the TV receiver which is supplied to the detector 2 from an input terminal 11 through a phase shifting network 5 connected to a second input terminal 2*b* of said synchronous detector 2. The phase of this reference signal is shifted by said phase shifting network 5. The amount of phase shift which is necessary will be described hereinafter in connection with FIG. 2**.

The output signal of said synchronous detector 2 is proportional to the component of the input signal applied to the first input terminal **2*a*, that is in phase with the reference signal applied to the second input terminal 2*b*. This output of the synchronous detector 2 is connected to an amplifier 3 which in turn is connected to a Schmitt trigger circuit 4. As is well known, a Schmitt trigger circuit has a built in threshold level and produces a constant voltage output during the time when the input signal is above the threshold level. The output of the synchronous detector 2 is amplified in amplifier 3 and is fed to the Schmitt trigger circuit, so that the output voltage pulse of said Schmitt trigger circuit has a duration in response to the signal detected in said synchronous detector 2**.

The output voltage of said Schmitt trigger circuit 4 is applied through a switch 6 to the input terminal of the color matrix circuit, for example the R-Y amplifier, which is provided in conventional color television receivers. If said switch 6 is actuated, the output voltage feeds into the R-Y color difference amplifier and a readily visible color change appears on portions of the screen. Assuming that the input signal fed to the R-Y amplifier is a positive-going pulse, the output signal is a negative-going pulse because a conventional R-Y amplifier is a common emitter transistor amplifier. This negative-going pulse is fed to the grid electrode of the red gun of a color picture tube. Thus, the beam current which stimulates the red phosphor is reduced. Moreover, the beam-current stimulating the green phosphor becomes greater because the emitter electrode of G-Y amplifier is usually coupled to the emitter electrode of the R-Y amplifier. Thus, a positive-going pulse is obtained at the grid electrode of the green gun of the picture tube. As a result, a greenish tint is given to flesh areas. The function of said switch 6 will be described hereinafter.

Figures 2, 3:
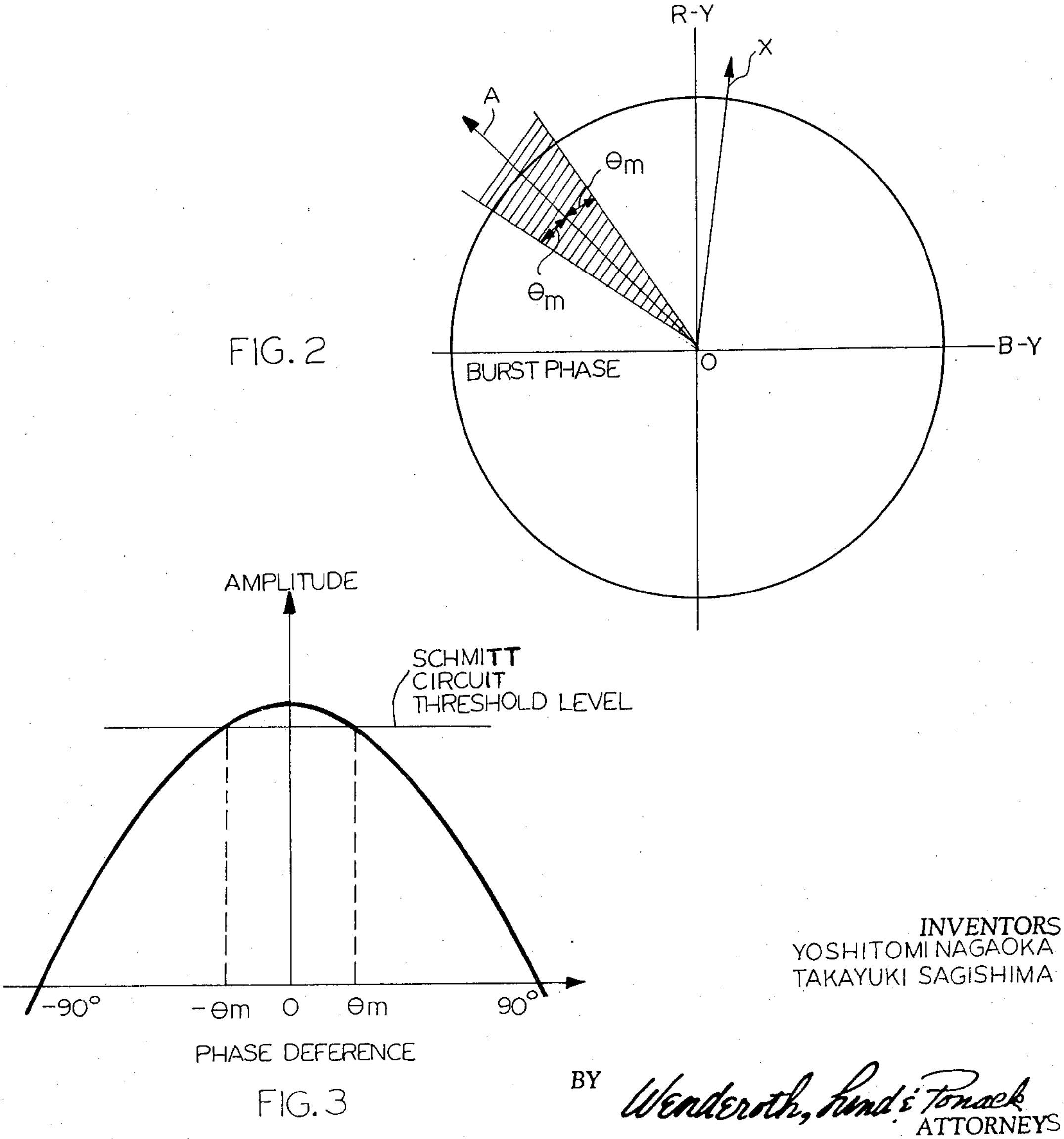
FIG. 2 is a color-spectrum wheel showing the phase relationship between reference signals.
FIG. 3 is a graph illustrating the output amplitude of a synchronous detector as a function of a phase difference.

FIG. 2 shows a color-spectrum wheel. The phase of the 3.58 MHz reference signal applied to the input terminal 11 shown in FIG. 1 is assumed to be "X." The memory-color for flesh corresponds to vector A. Said phase shifting network 5 in FIG. 1 advances the phase of the reference signal applied to the input terminal 11 to vector A. Therefore, the output signal of the synchronous detector 2 is proportional to the component of the input signal applied to the first input terminal 2*a* which is in phase with vector A, i.e., the memory-color for flesh.

In FIG. 3 there is shown the amplitude of the output signal of said synchronous detector 2 as a function of the phase difference between the phase of the input signal applied to the first input terminal 2*a* and that of the reference signal applied to the second input terminal 2*b*. The threshold level of said Schmitt trigger circuit 4 is set in proportion to a desired voltage value at the input terminal of said amplifier 3. This set voltage is also indicated in FIG. 3. It becomes clear from FIG. 3 that said Schmitt trigger circuit 4 produces a constant output voltage when the phase difference between the input signal at terminal 2*a* and the reference signal at terminal 2*b* is within $\pm\theta m$ from vector A. This means that when the phase of the modulated chrominance signal being transmitted falls into the sector indicated by the shading in FIG. 2, a constant output voltage is obtained from said Schmitt trigger circuit 4.

If the tint-control is exactly adjusted so as to reproduce a fleshtone having the same hue as the flesh memory-color and said switch 6 in FIG. 1 is actuated, a pulse feeds into the R-Y color difference amplifier. As a result, a flesh-colored portion,such as a human face, has greenish hue. On the other hand, if the tint-control is misadjusted, no greenish pattern appears on the bare-skin portion of the human image. In this case, the television viewer must adjust the tint-control so that the bare-skin portion of the human image has a greenish color. Because the tint-control is achieved by phase shift of the burst signal the vertical horizontal axis of the coordinates in FIG. 2 rotates. It is thereby possible to cause the televised chrominance signal for the bare-skin portion of the human image to fall into the shaded region of FIG. 2. Thus the bare-skin portion of the human image will be covered by a greenish color and the preferred reproduction of the flesh tone is achieved after removal of the greenish hue. The removal of the greenish pattern is accomplished by the release of said switch 6.

Because the greenish hue is necessary only when viewers want to adjust the tint-control, said switch 6 should be actuated only during manipulation of the tint-control. This can be accomplished, for example, by a mechanical set up consisting of a tint-control variable resistor with an OFF-ON switch, in which if the knob of the tint-control volume is pushed, the switch is actuated. Viewers push the knob and actuate the tint-control. After that the knob returns and releases the switch.

The phase angle corresponding to the flesh memory-color is lagging by about 45° with respect to the phase of the burst signal. Therefore, the phase of vector A shown in FIG. 2 should be about 45°. Due to different preferences for flesh tones, however, it is desired to make possible slight changes in the phase of the reference signal applied to said synchronous detector 2 around the position of vector A.

The value of $\theta_m$ in FIG. 3 should be less than 10° in order to make the setting of the tint-control accurate. To achieve this rather small value of $\theta m$ is difficult with the apparatus shown in FIG. 1. This is due to the fact that the phase discrimination is done at the portion having smallest slope in the cosine-function as shown in FIG. 3. This deficiency can be overcome as described below.

Figure 4:
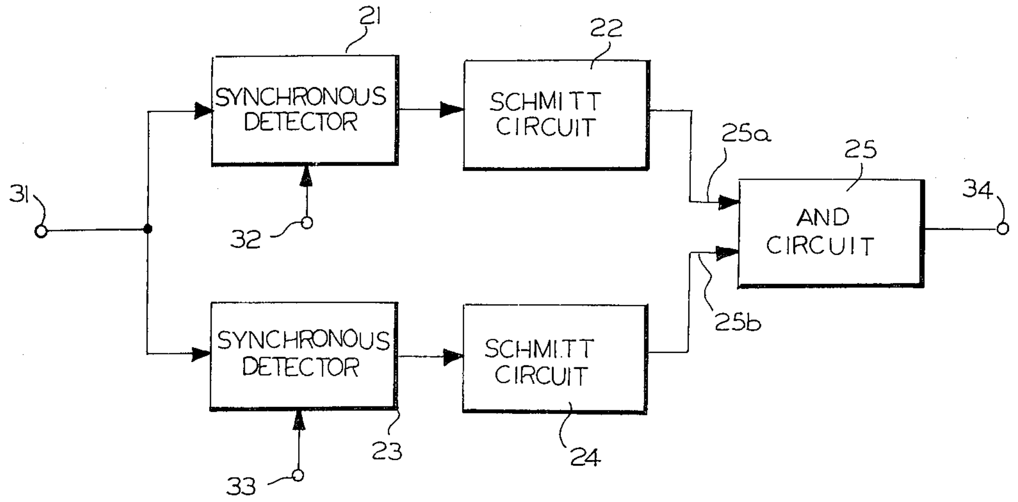
FIG. 4 is a block diagram of another embodiment of the tint-control indicating apparatus in accordance with the present invention.

In FIG. 4, there is shown a block diagram of another embodiment of the phase detection means in accordance with the present invention. This phase detection means has a first series connected synchronous detector 21 and a Schmitt circuit 22 and a second series connected synchronous detector 23 and a Schmitt circuit 24 is parallel with said first series connected synchronous detector 21 and Schmitt circuit 22. Input terminals 32 and 33 are provided for the respective synchronous detectors, and the outputs of the Schmitt circuits are connected to inputs 25*a* and 25*b* of an AND circuit 25. The output signal of limiter circuit 1 in FIG. 1 is applied to input terminal 31. This signal directly feeds into synchronous detectors 21 and 23 respectively. The 3.58 MHz reference signal is applied to each of the input terminals 32 and 33. The output signals of said synchronous detectors 21 and 23 are separately applied to the Schmitt trigger circuits 22 and 23, and only the positive part of each output signal is converted to a pulse in the same manner as with the synchronous detector 11. Each output signal of Schmitt trigger circuits 22 and 24 feeds into input terminals 25*a* and 25*b* of the AND circuit 25. The AND circuit 25 produces an output pulse only when pulses are supplied to both the input terminals 25*a* and 25*b* at the same time.

Figure 5:
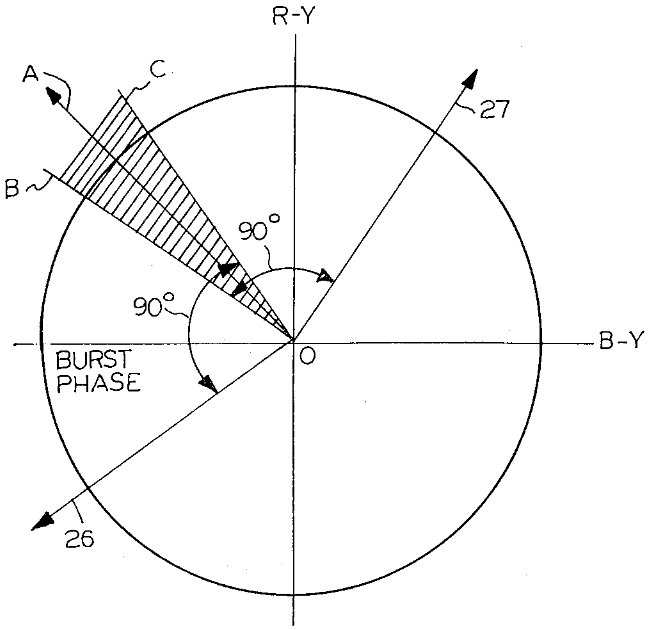
FIG. 5 is another color-spectrum wheel showing the phase relationship of reference signals.

It is assumed that the component of the modulated chrominance signal in the sector indicated by shading in FIG. 5 should be extracted. Note that vectors 26 and 27 are at right angles to vectors C and B respectively. The reference signals applied to the input terminals 32 and 33 are in phase with vectors 26 and 27 respectively. Said synchronous detector 21 in FIG. 4 thus generates a positive output when the chrominance signal has a phase falling to the right of vector B in FIG. 5, and said synchronous detector 23 generates a positive output when the chrominance signal has a phase falling to the left of vector C. Both said Schmitt trigger circuits 22 and 24 convert the positive parts of the outputs of said synchronous detectors 21 and 23 into pulses, and said AND circuit 25 extracts the common parts of the output pulses of said Schmitt trigger circuits 22 and 24 as mentioned before. Therefore, a signal within the sector indicated by the shading in FIG. 5 can successfully be extracted.

In this embodiment of the phase detection means, the phase discrimination is done at the portion of the cosine-function curve shown in FIG. 3 having the steepest slope. This makes possible precise discrimination of the phase and the use of a rather small value of $\theta m$.

Figure 6:
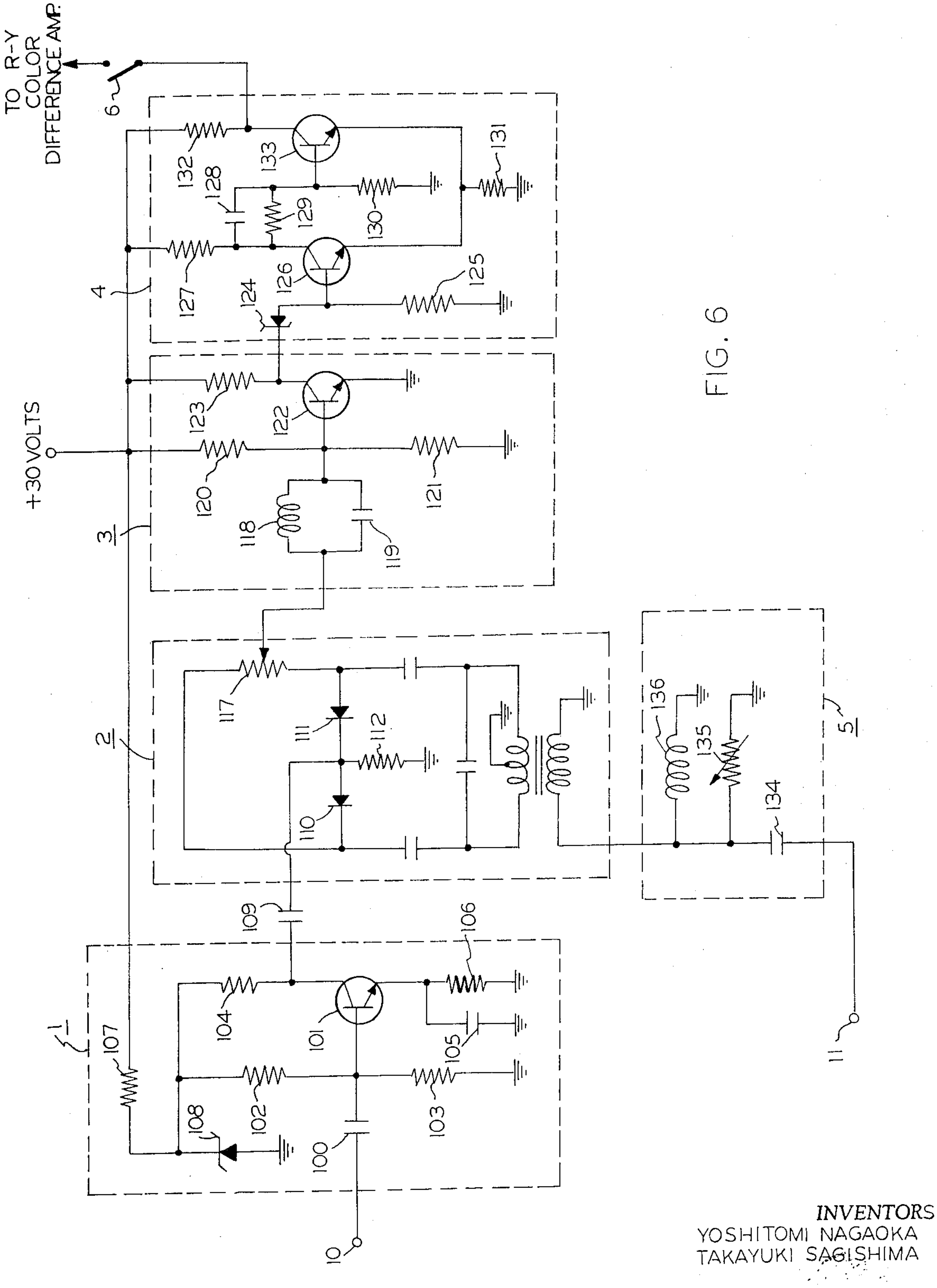
FIG. 6 is a schematic diagram of one practical embodiment of the apparatus shown in FIG. 1.

FIG. 6 shows a schematic diagram of a practical embodiment of the apparatus shown in FIG. 1 in which the elements shown in FIG. 1 are enclosed in dotted lines. The modulated chrominance signal separated by the bandpass amplifier from the composite color video signal is fed to the input terminal 10 and thence to limiter 1 comprised of capacitor 100 in series with the base of transistor 101. Transistor 101 is driven by a low voltage power source generated by the combined functioning of resistor 107 and Zener diode 108 and has resistors 102, 103, 104 and 106 and capacitor 105 connected thereto in a conventional manner. Transistor 101 suppresses the amplitude variations of the chrominance signal. The output signal of said limiter 1 is applied through capacitor 109 to the synchronous detector which is a well known balanced diode type synchronous detector having diodes 110 and 111 and resistor 112. The circuitry associated with these diodes is well-known,and hence a detailed description of the operation is thought to be unnecessary here. The 3.58 MHz reference signal in phase with the vector X of FIG. 2 is applied to the input terminal 11. This reference signal is advanced to the vector A in FIG. 2 by said phase shifter 5 comprising an inductor 136, capacitor 134 and variable resistor 135. Because the phase difference between vectors X and A in FIG. 2 is about 55°, the amount of phase shift necessary is normally 55°. The necessity to provide for adjustment of the memory flesh tone, however, requires means to change the demodulation axis of said synchronous detector 2. This is accomplished by providing the variable resistor 135.

The output signal of the synchronous detector is produced at the wiper arm of a variable resistor 117 and is proportional to the component of the input signal that is in phase with the phase of the reference signal applied to said synchronous detector 2. The amplifier 3 comprises parallel connected inductor 118 and capacitor 119 connected in a trap circuit which provides necessary attenuation at 3.58 MHz, and transistor 122 connected in a conventional common-emitter amplifier connection with resistors 121–123 and which amplifies the signal applied to the base electrode from the trap circuit.

A Schmitt circuit 4 is comprised of transistors 126 and 133, resistors 125, 127, 129–132 and capacitor 128 connected in a conventional manner. The output signal of said amplifier 3 is applied through a Zener diode 124 to the base of transistor 126. The threshold level of the Schmitt trigger circuit of FIG. 6 is about 6 volts. Zener diode 124 provides the necessary level-shift for matching the output signal of said amplifier 3 to said threshold level. Said Schmitt trigger circuit can thus extract the desired portion of the output of amplifier 3.

The positive-going pulse generated by said Schmitt trigger circuit 4 is applied to the input terminal of the R-Y color difference amplifier through switch 6 producing the greenish colored hue on the screen.

In the specific embodiment of FIG. 6, satisfactory results are obtained by employing the following specified components:

| | |
|---|---|
| Capacitor **100** | 18 pF |
| Transistor **101** | Silicon transistor 2SC269 |
| Resistor **102** | 6.8 KΩ |
| Resistor **103** | 8.2 KΩ |
| Resistor **104** | 680 Ω |
| Capacitor **105** | 330 pF |
| Resistor **106** | 1 KΩ |
| Resistor **107** | 10 KΩ |
| Zener diode | RD5A |
| Capacitor **109** | 220 pF |
| Diode **110** & **111** | Germanium diode 0A90 |
| Resistor **112** | 3.3 KΩ |
| Capacitors **113** & **114** | 39 pF |
| Capacitor **115** | 120 pF |
| Resistor **117** | 1 KΩ |
| Inductor **118** | 120 μH |
| Capacitor **119** | 15 pF |
| Resistor **120** | 150 KΩ |
| Resistor **121** | 5.6 KΩ |
| Transistor **122** | Silicon transistor 2SC828 |
| Resistor **123** | 5.6 KΩ |
| Zener diode **124** | RD 10A |
| Resistor **125** | 10 KΩ |
| Transistors **126** & **133** | Silicon transistors 2SC828 |
| Resistors **127** & **132** | 4.7 KΩ |
| Capacitor **128** | 10 pF |
| Resistor **129** | 22KΩ |
| Resistor **130** | 8.2 KΩ |
| Resistor **131** | 2.2 KΩ |
| Capacitor **134** | 39 pF |
| Resistor **135** | 5KΩ |
| Inductor **136** | 56 μH |

Figure 7:
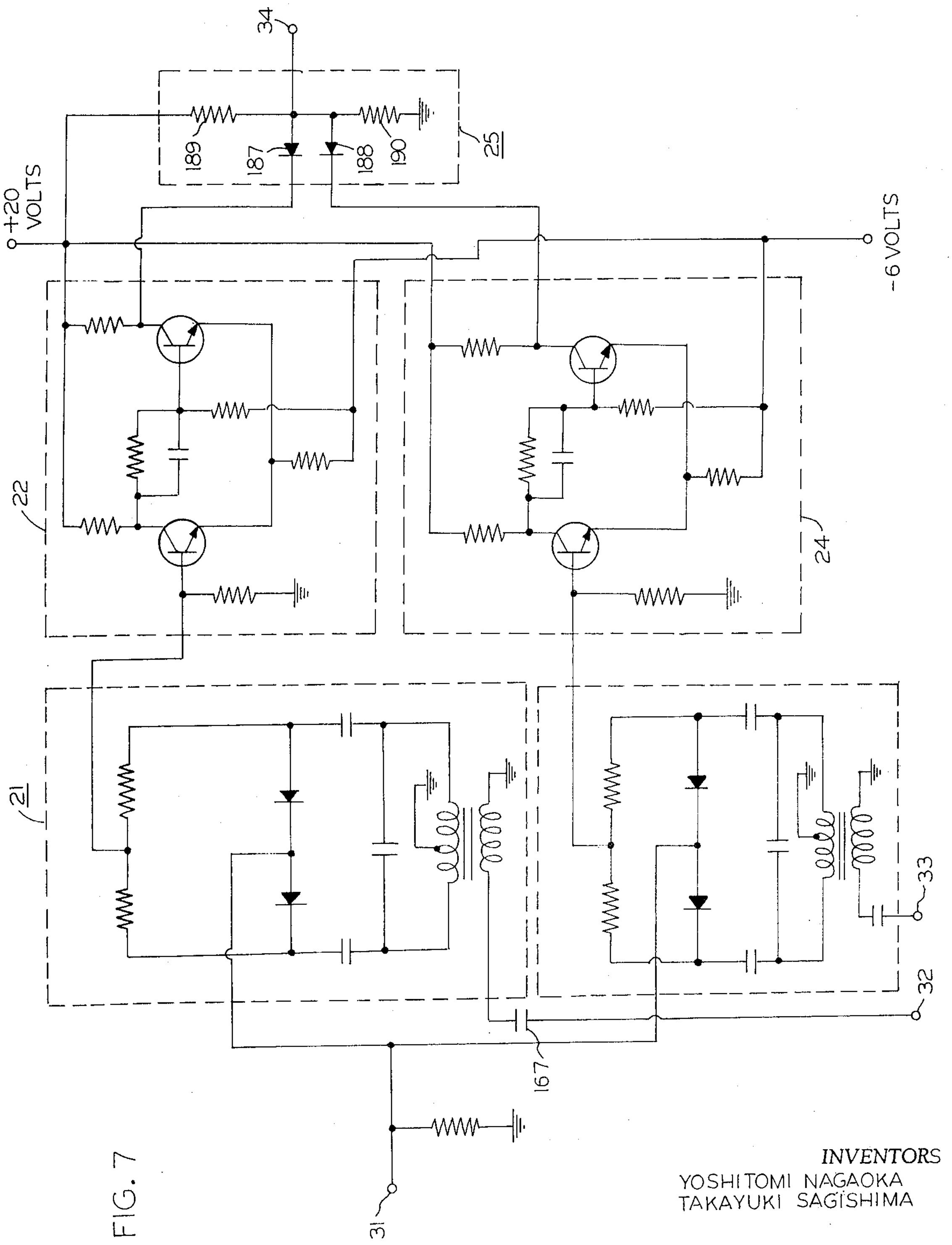
FIG. 7 is another schematic diagram of a practical embodiment of the apparatus shown in FIG. 4.

FIG. 7 shows a schematic diagram of the embodiment of said phase detection means illustrated in FIG. 4.

A chrominance signal with a relatively constant amplitude is applied to the input terminal 31 from the limiter. This signal is directly applied to both the synchronous detectors 21 and 23. These synchronous detectors are the same as that of FIG. 6. Two 3.58 MHz reference signals which are in phase with vectors 26 and 27 of FIG. 5 are separately applied to the input terminals 32 and 33. The output signals produced by the two synchronous detectors 21 and 23 directly feed into respective Schmitt trigger circuits 22 and 24. These Schmitt trigger circuits also are the same as that of FIG. 6 except that they have no Zener diodes and they are energized by two power sources. Two power sources, one of which is +20 volts and the other of which is −6 volts, are necessary to make the threshold levels of said Schmitt trigger circuits 0 volts. Thus only the positive outputs of said synchronous detectors 21 and 23 can trigger said Schmitt trigger circuits, which thus produce positive-going pulses. The output pulses of said Schmidtt trigger circuits 22 and 24 feed into the input terminals of AND circuit 25 consisting of diodes 187 and 188, and resistors 189 and 190. Said AND circuit 25 is a conventional diode AND circuit and produces an output pulse only when positive-going pulses are applied to both the input terminals at the same time. As a result, a positive-going pulse is obtained at the output terminal 34, when both said synchronous detectors 21 and 23 produce positive output signals simultaneously. Said synchronous detector 21 generates a positive output when the chrominance signal has a phase to the right of the vector B in FIG. 5, and said synchronous detector 23 generates a positive output when the chrominance signal has a phase to the left half of the vector C. The signal within the shaded region shown in FIG. 5 can therefore be successfully extracted with higher accuracy.

It is intended that all matter contained in the foregoing description and in the drawings shall be interpreted as illustrative only, not as limitative, of the invention.

What is claimed is:

1. A tint-control indicating apparatus for color television receivers comprising phase detecting means for separating from chrominance signals a chrominance signal component having a phase within a selected narrow sector in the color-spectrum wheel,pulse-forming means coupled to said phase detecting means for generating a pulse having a duration in response to the signal detected in said phase detecting means, and indicating means coupled to said pulse-forming means for producing a visible color change on a television screen in response to an output pulse from said pulse-forming means.

2. A tint-control indicating apparatus as claimed in claim 1, wherein said phase detecting means comprises a limiter circuit for making the amplitude of the chrominance signal relatively constant, a synchronous detecting means coupled to said limiter circuit for synchronously demodulating the output signal of said limiter circuit in a specific phase corresponding to the flesh memory-color, and a threshold detector coupled to said synchronous detecting means for allowing the transmission only of a signal above a predetermined level.

3. A tint control indicating apparatus as claimed in claim 2, wherein said synchronous detecting means includes a variable phase shifting network which produces from a 3.58 MHz reference signal a signal having a specific phase relative to the phase corresponding to the flesh memory-color in order to carry out synchronous demodulation.

4. A tint-control indicating apparatus as claimed in claim 1, wherein said phase detecting means comprises a limiter circuit, two synchronous detectors, one of which synchronously demodulates an output signal of said limiter circuit in the phase lagging 90° from the leading edge of said selected narrow sector and the other of which synchronously demodulates an output signal of said limiter circuit in the phase leading 90° from the trailing edge of said selected narrow sector, two Schmitt trigger circuits coupled to said synchronous detectors respectively, each of which generates a pulse in response to a positive part of the output signal of the respective synchronous detectors, and an AND circuit which is coupled to said Schmitt trigger circuits and supplies an output pulse when input pulses are supplied from both said Schmitt trigger circuits.

5. A tint-control indicating apparatus as claimed in claim 1, wherein said pulse-forming means comprises a Schmitt trigger circuit generating a pulse having duration that is in accordance with a detected signal from said phase detecting means.

6. A tint-control indicating apparatus as claimed in claim 1, wherein said indicating means comprises a switch device actuated during operation of a tint-control on the television receiver, and said switch device being connected to the output of said pulse-forming means and being adapted to be coupled to a color matrix circuit in the color television receiver.

* * * * *